(12) United States Patent
Thompson (10) Patent No.: US 8,020,944 B2
(45) Date of Patent: Sep. 20, 2011

(54) WHEEL SYSTEM WITH DEFORMABLE TIRE

(76) Inventor: Roger Thompson, Marietta, GA (US)

( * ) Notice: Subject to any disclaimer, the term of this patent is extended or adjusted under 35 U.S.C. 154(b) by 0 days.

(21) Appl. No.: 12/547,247

(22) Filed: Aug. 25, 2009

(65) Prior Publication Data

US 2010/0001576 A1   Jan. 7, 2010

Related U.S. Application Data

(62) Division of application No. 11/306,340, filed as application No. PCT/EP2004/006885 on Jun. 23, 2004, now Pat. No. 7,594,527.

(30) Foreign Application Priority Data

Jun. 24, 2003   (GB) .................................. 0314628.9

(51) Int. Cl.
*B60B 19/00*   (2006.01)
(52) U.S. Cl. .................................. 301/5.1; 305/6; 305/7
(58) Field of Classification Search ............... 301/5.1, 301/16; 305/4, 6, 7, 60; 280/47.1
See application file for complete search history.

(56) References Cited

U.S. PATENT DOCUMENTS

| | | | |
|---|---|---|---|
| 618,337 A | 1/1899 | Duffner | |
| 1,059,115 A | 4/1913 | Calmus | |
| 1,467,811 A | 9/1923 | La Plant | |
| 1,483,773 A | 2/1924 | Brickell | |
| 1,946,787 A * | 2/1934 | Feinberg et al. ............ | 301/12.2 |
| 2,106,670 A | 1/1938 | Walker | |
| 2,228,212 A | 1/1941 | Heintz | |
| 2,262,349 A | 11/1941 | Webster | |
| 2,348,256 A | 5/1944 | Hollis | |
| 2,711,221 A | 6/1955 | Kopczynski | |
| 2,753,912 A | 7/1956 | Mallow | |
| 2,786,540 A | 3/1957 | Sfredda | |
| 2,808,868 A | 10/1957 | Bryan | |
| 3,034,554 A | 5/1962 | Noble et al. | |
| 3,182,741 A * | 5/1965 | Roach ............ | 180/9.5 |
| 3,194,583 A | 7/1965 | Nottage | |
| 3,712,359 A | 1/1973 | Willams | |
| 3,773,388 A * | 11/1973 | Gorzell ............ | 301/5.1 |
| 3,776,291 A | 12/1973 | Boggs | |
| 4,171,676 A | 10/1979 | Kennel | |
| 4,262,724 A | 4/1981 | Sarkissian | |

(Continued)

FOREIGN PATENT DOCUMENTS

EP   341135 A1   11/1989

(Continued)

*Primary Examiner* — Russell D Stormer
(74) *Attorney, Agent, or Firm* — Gardner Groff Greenwald & Villanueva, P.C.

(57) ABSTRACT

A wheel comprising means for providing one or more protrusions in a ground-engaging surface of the wheel. In some embodiments, the wheel comprises a first hub, a tire mounted on the first hub, a second hub rotatable with respect to the first hub, and means for deforming the tire in a generally radial direction in response to relative rotation between the first and second hubs. The invention also provides a wheel cover comprising an outer surface having one or more protrusions and, when the cover is fitted to a wheel, the outer surface of the cover provides the ground-engaging surface of the wheel. The wheel and wheel cover of the invention are particularly suited for use with prams and similar vehicles in order to impart a rocking motion to the pram during use.

18 Claims, 5 Drawing Sheets

U.S. PATENT DOCUMENTS

| | | | |
|---|---|---|---|
| 4,601,519 A * | 7/1986 | D'Andrade | 301/45 |
| 4,906,051 A * | 3/1990 | Vilhauer, Jr. | 301/38.1 |
| 5,102,367 A * | 4/1992 | Mullaney et al. | 446/448 |
| 5,170,827 A | 12/1992 | Urleb et al. | |
| 5,407,054 A * | 4/1995 | Matsuda et al. | 198/370.09 |
| 5,492,390 A * | 2/1996 | Kugelmann, Sr. | 301/5.1 |
| 5,624,509 A | 4/1997 | Stanley | |
| 5,839,795 A * | 11/1998 | Matsuda et al. | 301/5.1 |
| 5,865,915 A | 2/1999 | Owen et al. | |
| 6,264,283 B1 | 7/2001 | Rehkemper et al. | |
| 6,422,576 B1 * | 7/2002 | Michaeli et al. | 280/5.22 |
| 6,918,544 B2 | 7/2005 | Ferguson | |
| 7,013,548 B1 | 3/2006 | Lotveit | |
| 7,017,687 B1 * | 3/2006 | Jacobsen et al. | 180/8.3 |
| 7,334,850 B2 * | 2/2008 | Spector et al. | 305/60 |
| 7,669,679 B2 * | 3/2010 | Rastegar et al. | 180/165 |

FOREIGN PATENT DOCUMENTS

| | | |
|---|---|---|
| JP | 63247109 A | 10/1988 |
| JP | 1249503 A | 10/1989 |
| JP | 3104717 A | 5/1991 |
| JP | 4113906 A | 4/1992 |

* cited by examiner

WHEEL SYSTEM WITH DEFORMABLE TIRE

CROSS-REFERENCE TO RELATED APPLICATIONS

This application is a divisional of U.S. Non-Provisional application Ser. No. 11/306,340 filed Dec. 23, 2005, which is a U.S. national phase filing of International Application No. PCT/EP2004/006885 filed Jun. 23, 2004, which claims the benefit of priority to Great Britain Patent Application No. 0314628.9 filed on Jun. 24, 2003. The entire disclosures of the prior applications are incorporated herein by reference.

FIELD OF THE INVENTION

The present invention is concerned with a wheel, in particular a wheel for a child's carriage, pram, buggy or other vehicle.

BACKGROUND TO THE INVENTION

It is well established that infants and toddlers enjoy some form of rocking motion in order to help them relax and/or to encourage sleep. In addition, rocking motion can be beneficial in releasing trapped wind, further comforting the child. It is known to provide coil springs, or the like, disposed between the body of a pram and the undercarriage thereof in order that a person pushing the pram may impart a rocking motion to the pram. However, it is necessary to effect this rocking motion manually.

It would be desirable, therefore, to provide means for imparting a rocking motion to a pram, or other vehicle, which does not require significant effort by the person 20 pushing the pram.

SUMMARY OF THE INVENTION

Accordingly, a first aspect of the invention provides a wheel comprising means 25 for providing one or more protrusions on or in a ground-engaging surface of the wheel. The, or each, protrusion causes a docking motion to be imparted to the vehicle, for example pram, to which the wheel is attached. It is particularly preferred to employ a wheel embodying the invention at only one side of the vehicle so that a side-to-side rocking motion is imparted to the vehicle's occupant.

In preferred embodiments, the wheel comprises a first hub, a tire mounted on the first hub, and means for deforming the tire in a generally radial direction. Preferably, the wheel comprises a second hub rotatable with respect to the first hub, the tire deforming means being responsive to relative rotation between the first and second hubs to deform said tire.

In one embodiment, the tire deforming means comprises at least one actuator operable to effect localized outward deformation of the tire. Preferably, the actuator includes a contact seated adjacent an inner wall of the tire, the contact being moveable between a retracted position and an extended position in which the contact is urged against an inner wall of the tire to effect deformation thereof. The actuator may comprise a connecting rod connected between the second hub and the contact such that relative rotation of the first and second hubs causes movement of the respective contact to the extended position.

In some embodiments, the first and second hubs are concentric, the second hub being of smaller diameter than the first hub. The second hub may be seated within the first hub.

The wheel may comprise means for maintaining the contact in the extended position against the bias of the tire. The contact maintaining means may comprise an abutment which is engagable with the actuator when the contact is in the extended position, in order to prevent return of the contact to the retracted position. The actuator may be biased into engagement with the restraining means by the tire, in order to prevent return of the contact to the retracted position. The contact maintaining means may for example comprise an abutment located in the path of the connecting rod.

In an alternative embodiment, the wheel includes a removable cover adapted to fit onto the wheel, the cover comprising an outer surface having one or more protrusions and, when the cover is fitted to the wheel, the outer surface of the cover provides said ground-engaging surface.

In a further embodiment, the tire deforming means comprises one or more cams and one or more corresponding cam followers, the cam being engagable with a respective cam follower to effect a localized deformation of the lyre. The cam may be provided on the second hub and the respective cam follower may be provided on an inner surface of the tire. Preferably, the arrangement is such that relative rotational movement of the first and second hubs causes each cam to engage with each respective cam follower.

The cam may comprise a roller, rotatably mounted on the second hub.

The cam follower may comprise a generally convex projection formed on the inner surface of the tire.

In preferred embodiments, when the wheel adopts a rocking state, two protrusions are provided in the ground-engaging surface, the two protrusions being generally oppositely disposed on the wheel.

A second aspect of the invention provides a wheel cover adapted to fit onto a wheel, the cover comprising an outer surface having one or more protrusions and, when the cover is fitted to the wheel, the outer surface of the cover provides the ground-engaging surface of the wheel. Advantageously, the wheel cover comprises a side wall shaped to define one or more recesses.

A third aspect of the invention provides a child's vehicle, for example a pram, buggy or stroller, comprising one or more wheels of the first aspect of the invention or one or more wheels fitted with a cover of the second aspect of the invention. Further advantageous aspects of the invention will become apparent to those ordinarily skilled in the art upon review of the following description of specific embodiments and with reference to the accompanying drawings.

BRIEF DESCRIPTION OF THE DRAWINGS

Specific embodiments of the invention will now be described by way of example and with reference to the accompanying drawings, in which:

FIG. 2b presents a plan view of the cover of FIG. 2a;

Figure 1:
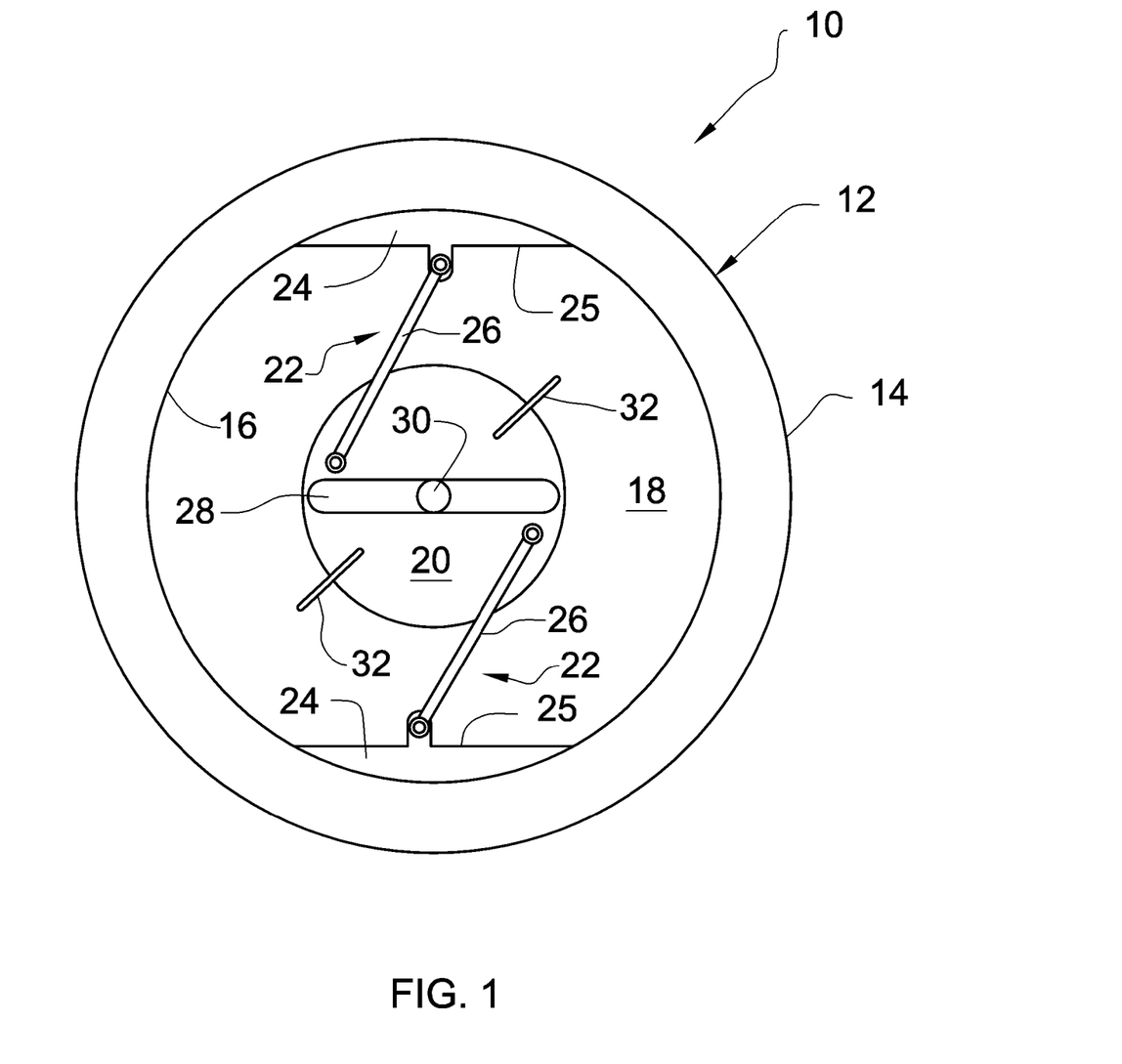
FIG. 1 presents a side view of a first embodiment of a wheel in which a pair of contacts forming part of the wheel are in a retracted position.

Referring now to FIG. 1, there is illustrated a first embodiment of a wheel, or wheel apparatus, generally indicated as 10. The wheel 10 is particularly suitable for use with a child's carriage or pushable vehicle (not shown), for example a pram or buggy. The wheel 10 is adapted to impart a rhythmic rocking motion to the pram as it is wheeled along, in order to lull a child to sleep, without requiring the person pushing the carriage to create the rocking action himself.

The wheel 10 comprises a tire 12 having an outer, or driving, surface 14 (the driving surface 14 being the surface that engages with the ground when the wheel 10 is in use) and an inner surface or wall 16. The tire 12 is mounted on a hub 18 such that the inner wall 16 engages with an outer surface of the hub 18. The tire 12 is formed from a resiliently deformable material, preferably a rubber or the like, in order to provide both shock absorption and grip. The use of a resiliently deformable material for the tire 12 is advantageous for the purposes of this aspect of the invention, as will become apparent from the following description.

The tire 12 is seated on the hub in any convenient manner. In the preferred embodiment, the tire 12 is seated on the hub 18 with an interference fit in order that the tire 12 is retained, in use, thereon. A retainer (not shown), such as a rim or the like, may be provided on the hub 18 to further secure the tire 12 in place. The hub 18 itself is rotatably mounted on an inner hub 20, which is in turn mountable, substantially at its midpoint 30, to an axle (not shown) of the carriage (not shown) in any convenient conventional manner. The arrangement is such that, in use, the wheel 10 is rotatable about an axis defined by the axle, and the inner and outer hubs 20, 18 are rotatable relative to one another about said axis.

The wheel 10 is also provided with means for deforming the tire 12 in the form of a pair of actuators 22, both of which operate identically to one another, and it is therefore sufficient to describe the configuration and operation of a single actuator 22. It will however be apparent from the following description that additional actuators 22 could be provided on the wheel 10, or indeed the wheel 10 could be provided with only a single actuator 22. Each actuator 22 comprises a contact 24 disposed between the hub 18 and the inner wall 16 of the tire 12. Thus, in the embodiment illustrated, there are a pair of generally diametrically opposed contacts 24. Mounted between each contact 24 and the inner hub 20 is a connecting rod 26, which also forms part of the actuator 22, which connecting rod 26 is pivotally mounted at respective ends thereof to the contact 24 and the inner hub 20. The wheel 10 is also provided with a handle 28, conveniently mounted on the inner hub 20, which enables the inner hub 20 to be rotated relative to the hub 18 about the wheel's axis of rotation.

In use, the wheel 10 may adopt a non-rocking state (as depicted in FIG. 1) in which each contact 24 is adopts a retracted state as shown in FIG. 1, and is maintained in said position by the resilience of the tire 12. The preferred arrangement is such that, when in the retracted state, the contact 24 is seated within a recess 25 formed in the hub 18 so as not to create a protuberance in the outer surface of the hub 18. Preferably, the contact 24 is shaped, i.e. curved, to serve as a continuation of the outer surface of the hub 18 when in the retracted state.

The wheel 10 is operable to adopt a rocking state (not illustrated) as is now described. With the contact 24 in the retracted position, the inner hub 20 may be rotated, via the handle 28, (clockwise as shown in FIG. 1) such that the contact 24 is forced outward, or extended, in a generally radial direction, by means of the connecting rod 26, against the return bias of the tire 12. As the contact 24 is displaced outwardly, so too will the surrounding portion of the tire 12, thereby resulting in a localized outward deformation of the tire 12 in the region of the contact 24. In embodiments where there are two contacts 24 as shown in FIG. 1, this results in the tire 12 that is generally elliptical in shape. Clearly, if only a single actuator 22 is provided, the wheel 10 would have a lopsided shape, while if more than 2 actuators 22 were provided the tire 12 would be correspondingly deformed. In any event, the wheel 10, and more particularly the tire 12, comprises, when in the rocking state, one or more protuberance that extends generally radially of the wheel 10 such that the outer periphery of the tire 12, or its driving surface 14, is non-circular. Thus, with the wheel 10 in the rocking state, when the carriage is wheeled forward, or indeed backwards, a gentle up or down reciprocating motion is imparted thereto by virtue of the, or each protuberance formed in the tire 12.

The resilience of the tire 12 tends to have the effect of urging the contact 24 back into the retracted position. For this reason, the wheel 10 is preferably provided with an abutment 32 associated with each actuator 22, which is adapted to secure the contact 24 in the extended position. The abutment 32 is secured to the hub 18, but projects radially inward beyond the interface between the hub 18 and the inner hub 20. Thus, as the inner hub 20 is rotated, the contact 24 will reach its maximum outward displacement after approximately one quarter of a revolution of the inner hub 20. The inner hub 20 is then rotated just beyond this point, whereby the end of the connecting rod 26 comes into contact with the respective abutment 32, and cannot therefore be turned any further. Thus, although the tire 12 will be urging the contact 24 back into the retracted position, the abutment 32 will prevent this from occurring, therefore securing the contact 24 in its extended position. In order to return the contact 24 to the retracted position, it is simply necessary to rotate the inner hub 20, via the handle 28, back to the position shown in FIG. 1.

It will be understood that any other suitable equivalent could be used in place of the actuator 22, while maintaining the general functionality of the wheel 10. For example, a simple rack and pinion (not shown) could be used, or a conventional worm/screw arrangement (not shown).

Figure 2A:
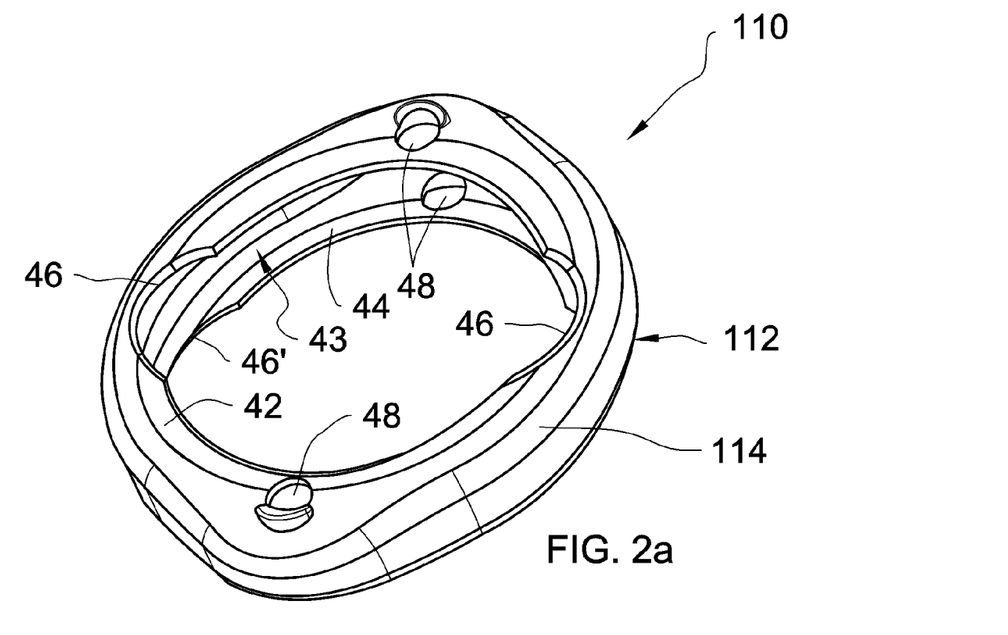
FIG. 2a presents a perspective view of a cover for an existing wheel of a child's carriage, or other vehicle.
Figure 2B:
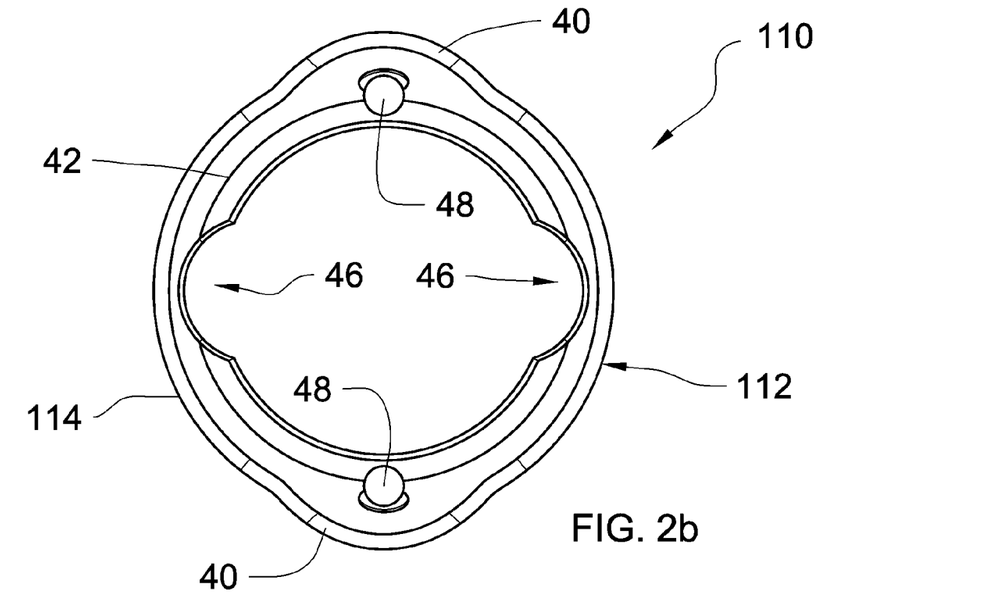
Figures 3, 4, 5:
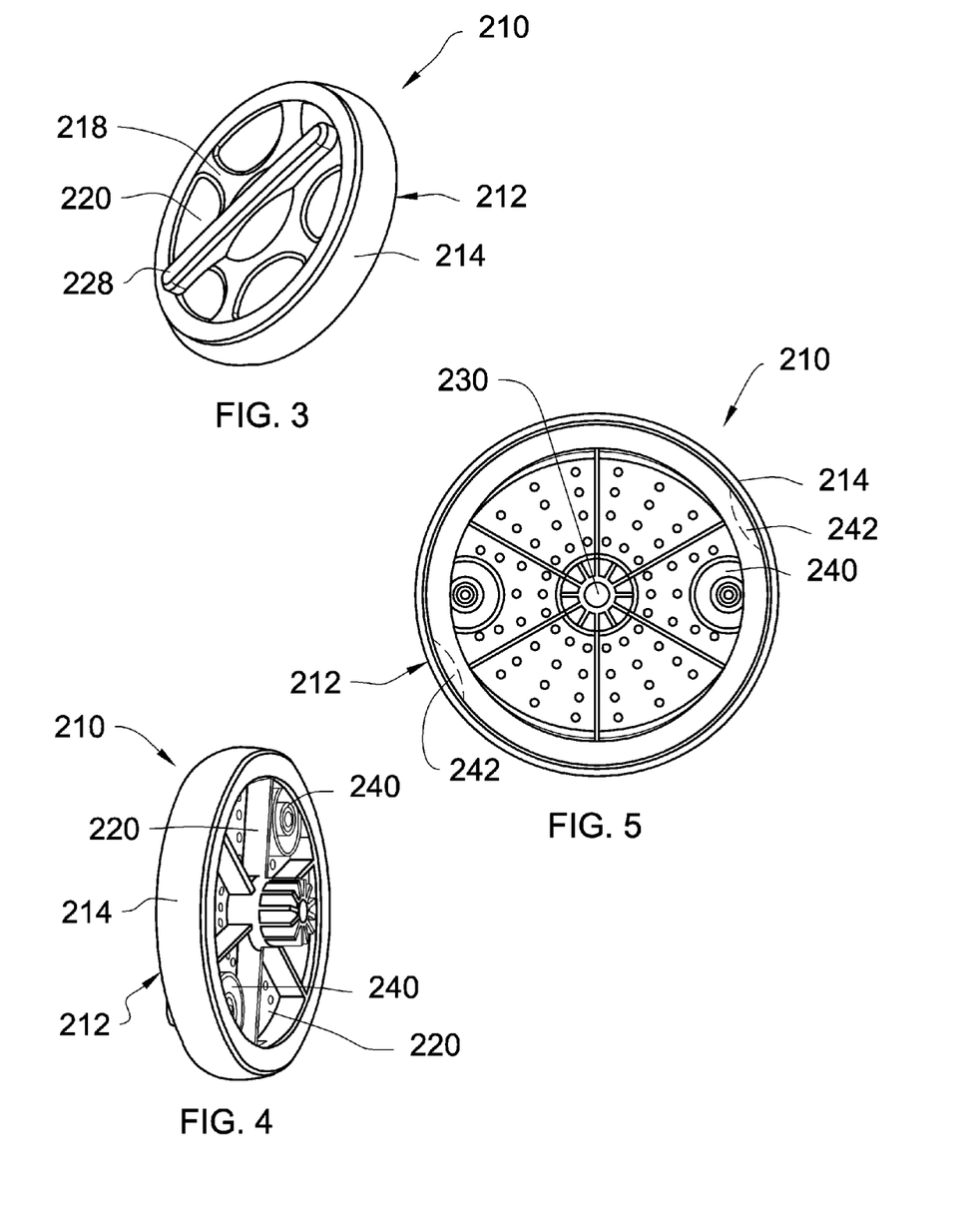
FIG. 3 presents a perspective view of a third embodiment of a wheel in which an obverse side of the wheel is visible.
FIG. 4 presents a perspective view of the reverse side of the wheel of FIG. 3.
FIG. 5 presents a plan view of the reverse side of the wheel of FIG. 3 in a non-rocking state.
Figure 6:
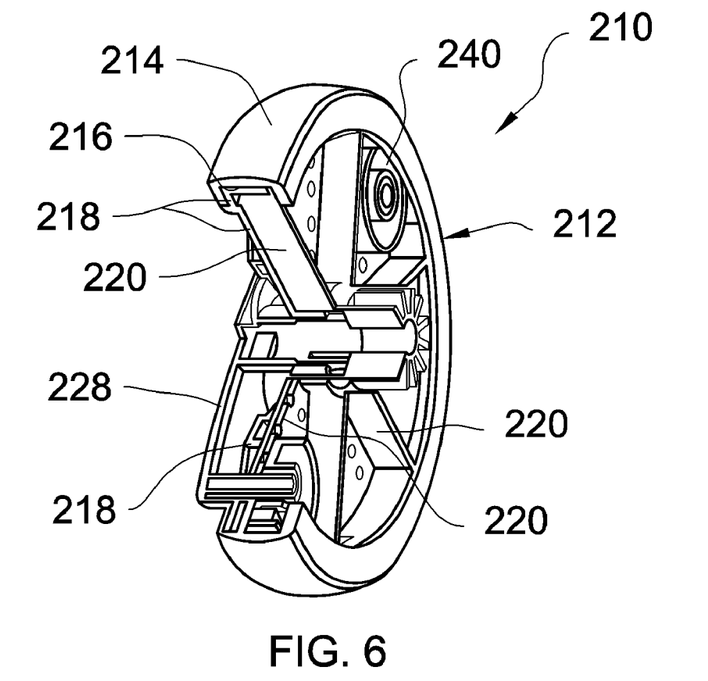
FIG. 6 presents a cut-away perspective view of the wheel of FIG. 3.
Figure 7:
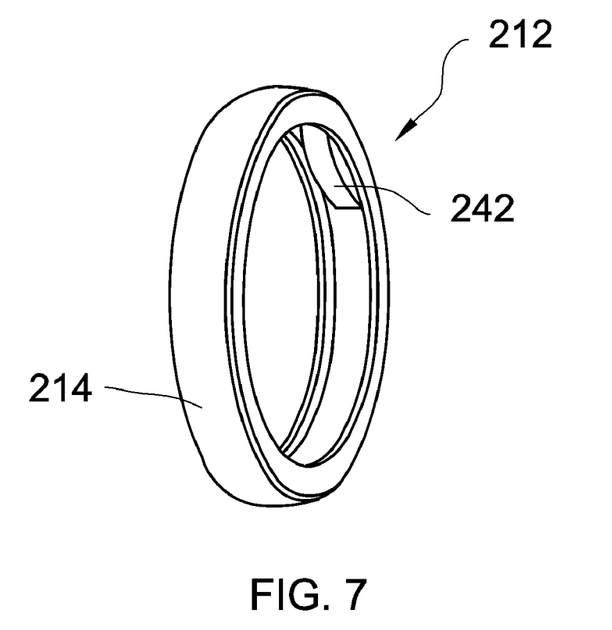
FIG. 7 presents a perspective view of a tire for the wheel of FIG. 3.

Referring now to FIG. 2, there is illustrated an alternative embodiment of a wheel apparatus, generally indicated as 110, in which like components have been accorded like reference numerals, and unless otherwise stated, perform a like function. The wheel apparatus 110 takes the form of a removable, slip-on cover for retrofitting to an existing wheel (not shown), especially that of a child's carriage (not shown). The apparatus 110 comprises a tire 112 which is provided with at least one, and in the preferred embodiment illustrated, a pair of protrusions 40 on a driving, or ground-engaging, surface 114 thereof, which will impart a reciprocating motion to the carriage when driven. The tire 112 comprises a front wall 42 and a rear wall 44 which, together with the driving surface 114, define a channel 43 for receiving a wheel (not shown) of the carriage.

In order to enable the cover 110 to be fitted, it is preferably formed from a resiliently deformable material, preferably rubber, such that the cover 110 may be stretched over the existing wheel, (not shown), and will then return to its original shape in order to effect a grip on the existing wheel. The cover 110, and in particular the wheel-receiving channel that it defines, is therefore preferably slightly smaller in dimension than the existing wheel to which it is to be fitted. In preferred embodiments, the cover 110 is formed from a resilient elastic material so that it may be fitted to wheels of various sizes.

In addition, the cover 110 is advantageously provided with at least one and preferably two recesses 46 in the front wall 42 which open onto the inner area defined by the cover 110. The recesses 46, which are preferably generally oppositely disposed on the cover 110, facilitate the further deformation/bending of the cover 110 to allow same to be fitted to a wheel. Similar recesses 46 may be provided in the rear wall 44, preferably substantially in register with the recesses 46. The cover 110 is also preferably provided with at least one and preferably two apertures 48 which are dimensioned to allow a person's fingers to be inserted therein, in order to provide points at which the cover 110 may be firmly gripped, and therefore stretched, for fitting to a wheel. The apertures 48 are preferably generally diametrically oppositely disposed on the cover 110 and may be provided in the front wall 42 and/or in the rear wall 42.

It will be appreciated that the cover 110 may be quickly and easily fitted or removed as required, and does not have to be permanently secured to the existing wheel (not shown). It will also be appreciated that as the cover 110 is conveniently formed as a single piece, with no moving parts, it may be inexpensively manufactured, is simple to operate, and requires no maintenance.

Referring now to FIGS. 3 to 8, a third embodiment of a wheel 210 is described. The wheel 210, or wheel apparatus, comprises a first hub 218 which carries a tire 212. The tire 12 having a ground-engaging, or driving surface 214 and an inner surface or wall 216. The tire 212 is mounted on the hub 218 such that the inner wall 216 engages with an outer surface, or periphery, of the hub 218. The tire 212 is advantageously formed from a resiliently deformable material, preferably a rubber or the like. The tire 212 may be seated on the hub 218 in any convenient manner. In the preferred embodiment, the tire 212 is seated on the hub 218 with an interference fit in order that the tire 212 is retained, in use, thereon. A retainer (not shown), such as a rim or the like, may be provided on the hub 218 to further secure the tire 212 in place. The hub 218 itself is rotatably mountable, either directly or indirectly, on an axle (not shown) of the carriage or other vehicle (not shown) of which the wheel 210 forms part during use. The wheel 210 may be rotatably mounted on the axle in any convenient conventional manner. By way of example, the wheel 210 is provided with a generally centrally located axle socket 231 for this purpose. The arrangement is such that, in use, the wheel 210 is rotatable about an axis defined by the axle.

The wheel 210 comprises a second hub 220 which is rotatable with respect to the first hub 218 about said axis. To this end, the second hub 220 may be directly or indirectly mounted on the axle. In the preferred embodiment, the first and second hubs 218, 220 are located adjacent one another in the axial direction. The wheel 210 further comprises a lever or handle 228 coupled to the second hub 220 for effecting relative rotational movement between the first and second hubs 218, 220.

The wheel 210 further includes means for deforming the tire 212 upon relative rotational movement between the first and second hubs 218, 220. In the preferred embodiment, the tire deforming means comprises one or more cams 240, or equivalent device, provided on the second hub 218, and one or more cam followers 242, or equivalent device, provided on the inner surface of the tire 212, the arrangement being such that, upon relative rotational movement between the first and second hubs 218, 220, the or each cam 240 engages with a corresponding cam follower 242 resulting in a respective localized deformation of the tire 212 in a generally outwards, or radial, direction.

In the embodiment illustrated in FIGS. 3 to 8, the wheel 210 comprises two cams 240 in the form of respective wheels or rollers rotatably mounted on the second hub 220 for rotation about a respective axis that is generally parallel with the axis of rotation of the wheel 210. Preferably, the rollers 240 are generally oppositely disposed on the hub 220. The rollers 240 are mounted on the hub 220 such that at least a portion of each roller 240 projects beyond the adjacent portions of the second hub 220 in a generally radial direction. In alternative embodiments (not illustrated), there need not necessarily be two cams 240 and the cams 240 need not necessarily be rotatable. By way of example, the cams may alternatively comprise a respective projection, or cam surface, on the periphery of the second hub 220.

The cam follower 242 preferably takes the form of a respective projection or cam surface provided on the inner surface of the tire 212, and therefore facing the second hub 220. As may best be seen from FIG. 7, the cam follower 242 may preferably take the form of a generally convex projection on the inner surface of the tire 212. It will be apparent that the second hub 220 is shaped and dimensioned to provide a respective gap between itself and the tire 212, at least in the vicinity of the cams 240 and cam followers 242, to accommodate the cams 240 and cam followers 242.

Figure 8:
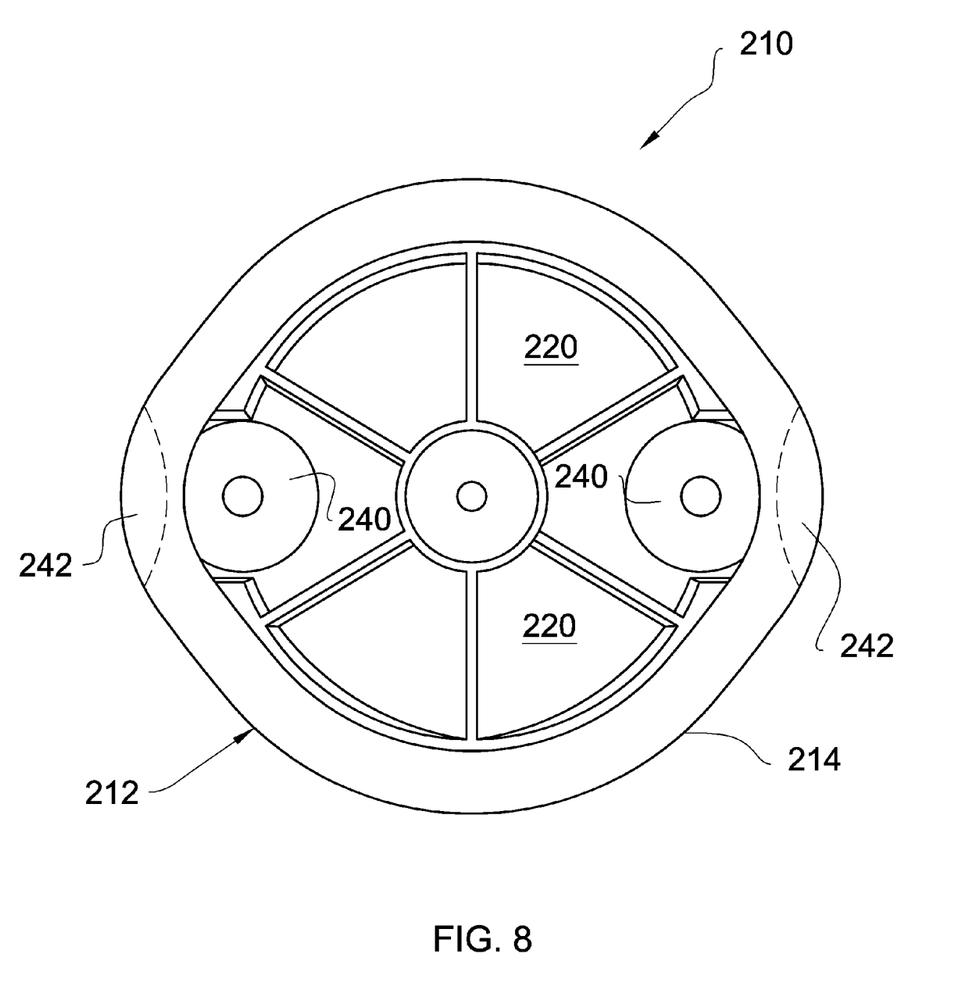
FIG. 8 presents a plan view of the reverse side of the wheel of FIG. 3 in a rocking state.

The wheel 210 is operable between a non-rocking state (depicted in FIGS. 3 to 7) and a rocking state (depicted in FIG. 8). As may best be seen from FIG. 5, in the non-rocking state, the cams 240 and associated cam followers 242 do not inter-engage, or at least do not inter-engage in such a way that the tire 212 is deformed from its normal, generally circular, shape. Upon relative rotational movement between the first and second hubs 218, 220, each cam 240 engages with the respective cam follower 242 with the result that a respective portion of the tire 212 is deformed (FIG. 8). Hence, in the rocking state, the tire 212 is deformed to a non-circular shape. In FIG. 8, the tire 212 is generally elliptical in the rocking state although it will be apparent that the shape of the tire 212 in the rocking state will depend on the number or and arrangement of cams 240/cam followers 242. In normal use, the handle 228 may be used to rotate the second hub 220 relative to the first hub 218 (while the first hub 218 and the tire 212 do not rotate) in order to operate the wheel 210 between the rocking and non-rocking modes.

The wheels 10, 210 or cover 110 may replace, or be fitted to, one or more conventional wheels of a given vehicle (not shown). In a preferred mode of use, however, only one wheel 10, 210 or over 110 is used at only one side of the vehicle (not shown), the remaining wheels of the vehicle being conventional. For example, for a pram or buggy having one or more wheels at opposite sides, the wheel 10, 210 or cover 110 may replace or be fitted over only one of the side wheels, preferably a rear side wheel or a non-steerable wheel. As a result, the vehicle is not only rocked up and down as it is pushed along, but also in a side-to-side manner (with respect to the general direction of movement of the vehicle). Hence a gentle sideways rocking motion is imparted to the vehicle's occupant. This is found to be particularly effective in lulling an infant to sleep.

The present invention is not limited to the embodiments described herein, which may be amended or modified without departing from the scope of the present invention.

What is claimed is:

1. A wheel system to be secured within a tire and impart a rhythmic rocking motion to a baby carriage, the wheel system comprising:
   first and second hubs, wherein the second hub is rotatable with respect to the first hub, wherein the second hub has a smaller diameter than the first hub;
   a contact member positioned between the second hub and the tire;
   at least one actuator, wherein the at least one actuator comprises a connection arm pivotally mounted between the second hub and the contact member, wherein the contact member is moveable between a retracted position not deforming the shape of the tire and an extended position exerting an outwardly-driven force on the tire to deform the shape of the tire.

2. The wheel system of claim 1, wherein a relative rotation between the first and second hubs causes movement of the contact member between the retracted and extended position.

3. The wheel system of claim 2, further comprising an abutment engageble with the actuator when the contact member is in the extended position.

4. The wheel system of claim 3, wherein the abutment is in a rotational path of the connecting arm.

5. The wheel system of claim 1, wherein the system comprises two actuators coupled in diametrically opposite positions within the first and second hubs.

6. The wheel system of claim 1, wherein the contact member is seated within a recess in the first hub.

7. The wheel system of claim 1, wherein the contact member is shaped to correspond to the outer surface of the first hub.

8. The wheel system of claim 1, wherein when in the extended position, the contact member extends outside of the diameter of the first hub.

9. The wheel system of claim 1, further comprising a handle, wherein the handle causes rotation of the second hub relative to the first hub.

10. A wheel system to be secured within a tire and impart a rhythmic rocking motion to a baby carriage, said wheel system comprising:
    a first and second hub, wherein the second hub is rotatable with respect to the first hub, wherein the second hub has a smaller diameter than the first hub;
    a handle, wherein rotation of the handle causes rotation of the second hub relative to the first hub;
    a contact body positioned between the second hub and the tire; and
    a connection member pivotally secured between the second hub and the contact body;
    wherein the contact body is moveable between a retracted position and an extended position by rotation of the handle, wherein in the extended position the contact body exerts an outwardly-driven force on the tire.

11. The wheel system of claim 10, further comprising an abutment engageble with the connection member when the contact body is in the extended position.

12. The wheel system of claim 10, wherein the system comprises two connection members pivotally secured in diametrically opposite positions within the first and second hubs.

13. The wheel system of claim 10, wherein the contact body is seated within a recess in the first hub.

14. The wheel system of claim 10, wherein the contact body is shaped to correspond with the outer surface of the first hub.

15. The wheel system of claim 10, wherein when in the extended position, the contact extends outside of the diameter of the first hub.

16. A wheel system for imparting a rhythmic rocking motion to a baby carriage, said wheel system comprising:
    a removable tire having an inner surface, wherein the inner surface comprises at least one cam follower;
    a first and second hub, wherein the second hub is rotatable with respect to the first hub, wherein the second hub has a smaller diameter than the first hub;
    at least one cam roller engageable with the at least one cam follower, wherein the at least one cam roller is mounted on the second hub; and
    a handle, wherein the handle causes rotation of the second hub relative to the first hub.

17. The wheel system of claim 16, wherein relative rotational movement of the first and second hubs effects the engagement of the at least one cam roller with the at least one cam follower.

18. The wheel system of claim 16, wherein a portion of the cam roller projects beyond the diameter of the second hub in a radial direction.

* * * * *